Oct. 25, 1927.
R. H. HASSLER
1,646,583
REBOUND CHECK WITH LUBRICATING SYSTEM
Filed Dec. 18, 1925          3 Sheets-Sheet 1
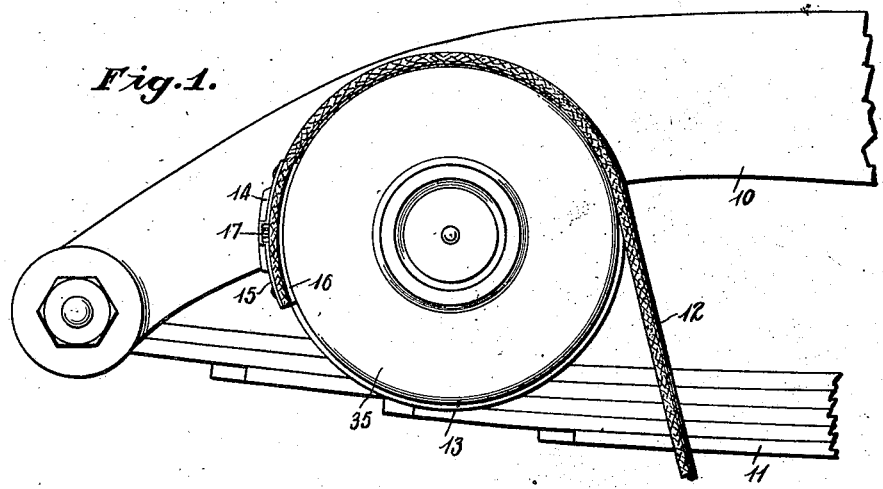
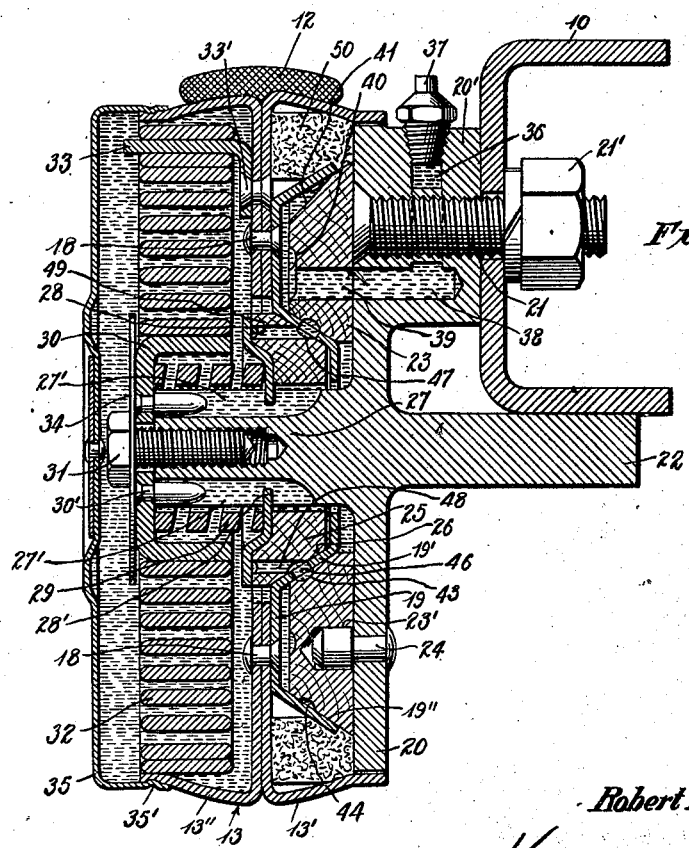
Inventor
Robert H. Hassler
By Knight Bros
Attorneys Oct. 25, 1927.                                              1,646,583
R. H. HASSLER
REBOUND CHECK WITH LUBRICATING SYSTEM
Filed Dec. 18, 1925                3 Sheets-Sheet 2

Inventor
Robert H. Hassler
By Knight Bros
Attorneys

Oct. 25, 1927.
R. H. HASSLER
1,646,583
REBOUND CHECK WITH LUBRICATING SYSTEM
Filed Dec. 18, 1925
3 Sheets-Sheet 3
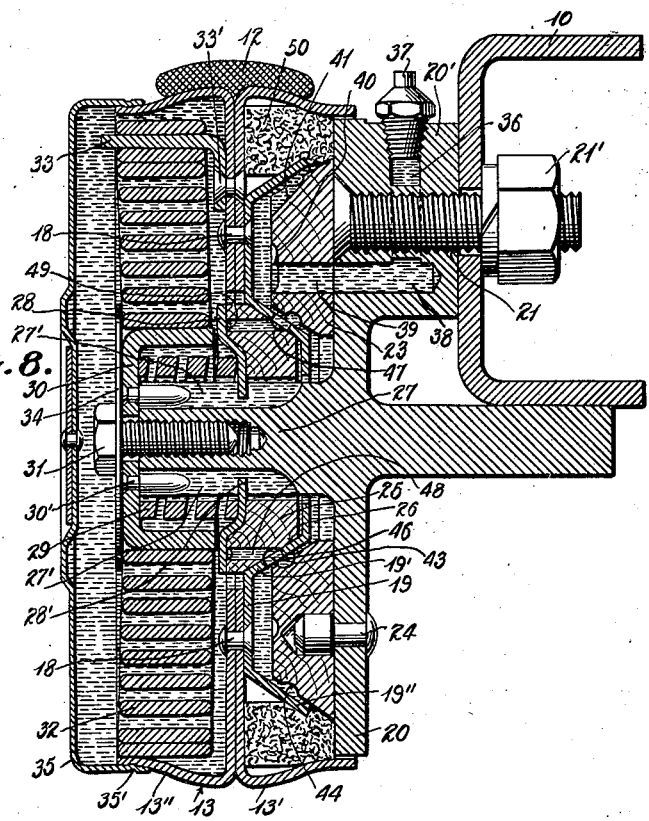
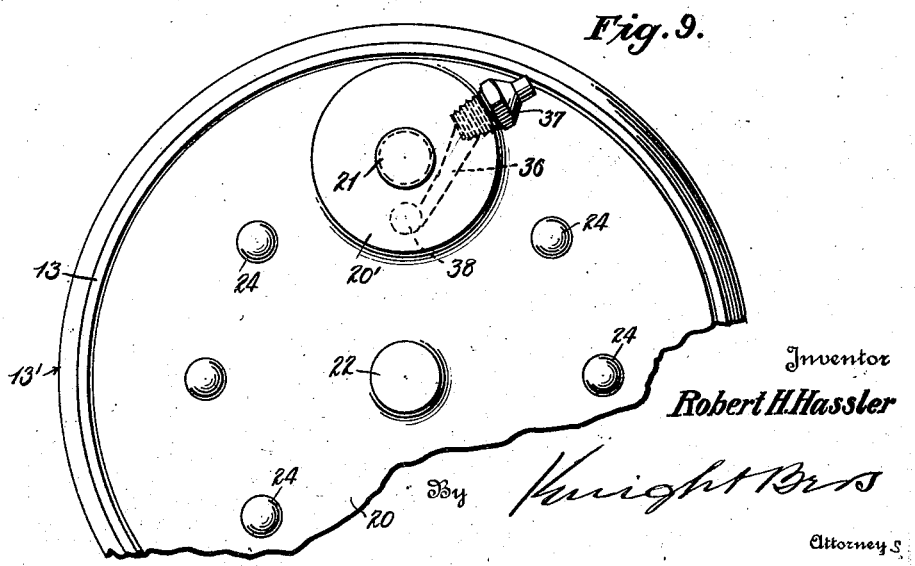
Inventor
Robert H. Hassler
By Knight Bros
Attorneys Patented Oct. 25, 1927.

1,646,583

UNITED STATES PATENT OFFICE.

ROBERT H. HASSLER, OF INDIANAPOLIS, INDIANA, ASSIGNOR, BY MESNE ASSIGNMENTS, TO HASSLER MANUFACTURING CO., INC., OF INDIANAPOLIS, INDIANA, A CORPORATION OF DELAWARE.

REBOUND CHECK WITH LUBRICATING SYSTEM.

Application filed December 18, 1925. Serial No. 76,294.

The present invention relates to improvements in friction rebound checks and especially contemplates the provision of means whereby the friction faces may be kept thoroughly lubricated at all times. I shall describe my invention in connection with a rebound check in which impregnated wood friction elements of conical configuration are pressed by spring means into wedging engagement with mating metal elements, a relative motion of the cooperating elements being induced in consequence of the flexure of the vehicle springs. The elements are so provided with lubricating ducts that grease under pressure may be introduced between the friction faces. The grease being under considerable pressure, as in an alemite system, the faces are forced apart and thoroughly reconditioned. They resume their normal frictional relation almost at once under subsequent actuation.

Figure 3:
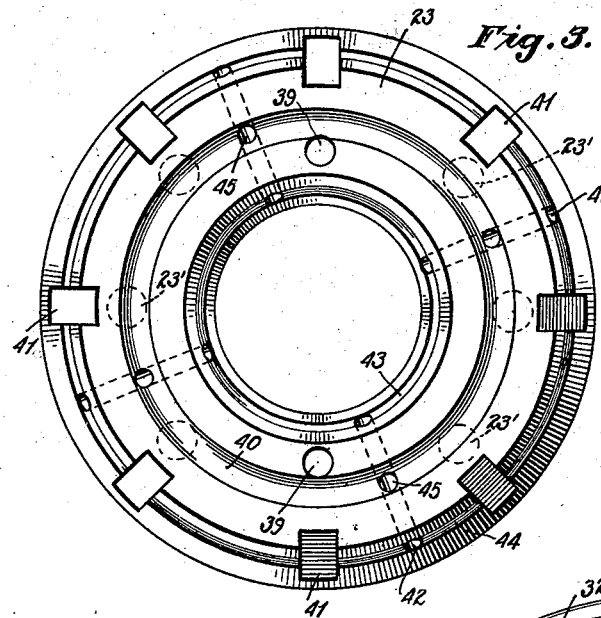
Figure 4:
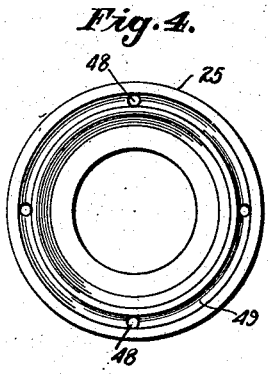
Figure 6:
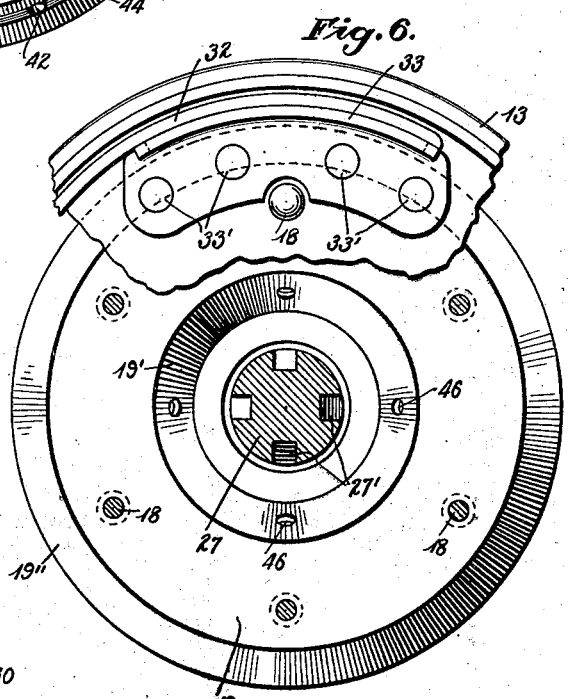
Figure 5:
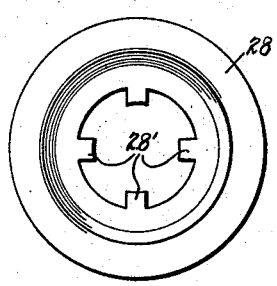
Figure 7:
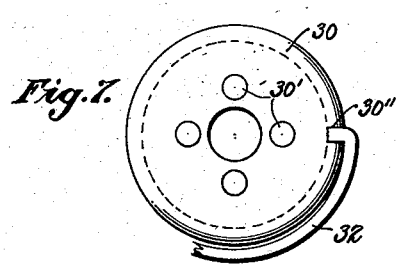

Due to the conical shape of the friction members they are particularly efficient when lubricated as described above and the spring pressure with which they are urged together remains comparatively small. The wear is reduced, heating is substantially eliminated, and a dash-pot effect is obtained. Moreover, moisture is kept out and rusting thus prevented. Re-servicing is accomplished without disassembling the parts or dismounting the casing or drum in which the parts are disposed. Other advantages will be apparent as the description of my invention proceeds, reference being had to the accompanying drawings, in which Fig. 1 shows a rebound check or stabilizer of the type contemplated in operative position at the front end of an automobile chassis, Fig. 2 is a vertical section of Fig. 1, the automobile spring being omitted, Fig. 3 is a face view of a main friction element, Fig. 4 is a face view of a thrust member or secondary friction element, Fig. 5 is a face view of a thrust plate which cooperates with the thrust member of Fig. 4, Fig. 6 is a view of the shock absorber housing looking at Fig. 2 from the left, the cover and some of the inner parts being omitted, Fig. 7 shows a spring adapter for the stabilizer springs, Fig. 8 is a view similar to Fig. 2 showing the separated friction faces, and Fig. 9 is a view in part of the rear face of the stabilizer.

In Figs. 1 and 2, 10 indicates a side element of the chassis frame and 11 a main spring pivoted thereto. In the combination as shown, the stabilizer proper is attached to the frame and adapted to be oscillated by the actuating strap 12 fastened at one end to the vehicle axle and at its other to the outer periphery of the drum 13 of the stabilizer. As may be seen from Fig. 1, the drum 13 has a projecting plate 14 while the strap 12 has two protective plates 15 and 16 at its end, these latter and the strap being slotted so as to fit over plate 14 and being held thereon by means of split pin 17 passing through a hole in the plate 14. This arrangement is contrary to the usual practice of passing the strap within the drum and is an important feature in excluding all foreign matter from the working parts.

The drum 13 is formed of two dished annuli 13' and 13" backed up and riveted together as at 18. These rivets also secure a dished annulus 19 which has the conical faces 19' and 19", inverted with respect to each other. A circular back plate 20 fits into the rear of the drum section 13' and has a spacing boss 20' through which passes a screw 21. The screw 21 passes through an aperture in frame element 10 and is secured by a nut 21'. A projection 22 of the back plate passes under frame element 10 in contact therewith to prevent rotation of the back under strain.

On its front face the back plate has rigidly secured thereto, coaxially, an annulus 23 (Fig. 2) of impregnated wood having conical faces mating with the faces 19' and 19" of annulus 19. This annulus 23, which may be termed the main friction element, has a series of blind holes 23' in its rear face into which project studs 24 fixed in the back plate 20. Rotation of element 23 is thus prevented.

A further annulus, 25, of impregnated wood, which may be termed thrust member, bears against a face 26 of the annulus 19. The back plate 20 has a central boss 27 extending centrally through the described ensemble. This boss 27 has four axially extending grooves 27' (Figs. 2 and 4) into which take the lugs 28' of a thrust plate 28 (Figs. 2 and 5) whereby rotation of the latter is prevented. A compression spring 29 loosely surrounds boss 27 and is compressed between thrust plate 28 and the adapter cap 30. This latter is held in place by a cap screw 31 extending through a central hole therein and engaging in a threaded axial bore of the boss and by studs 30' engaging in grooves 27' for preventing its rotation, (Figs. 2, 3 and 6).

From the description thus far, it will be seen that, upon relative rotation of the drum 13 and back plate 20, a resistance will occur due to friction between thrust member 25 and thrust plate 28 or face 26, or both (member 25 being a floating member), and between faces 19', 19" and member 23.

The drum having been thus rotated, as on the vehicle rebound, means are necessary to return the drum to normal position, that is, to rewind the strap. For this purpose I provide a spiral torsion spring 32 having sufficient force to return the drum against the constant resistance of the friction elements. One bent end of this spring is retained in an axially extending slot 30" of the spring adapter 30, see Fig. 6, while the other bent end is retained by a plate 33 riveted as at 33' to the vertical flange of the drum. To prevent outward displacement of the spring I provide a washer 34, held in place by screw 31 and covering the inner convolutions of the spring. A dished cover 35, having a peripheral bead 35' engaging in a peripheral groove of drum section 13", encloses the whole. Drum 13" upon assembling, is packed with grease.

In applying the described stabilizer the torsion spring is of course adjusted to the correct strength, this being accomplished to a degree by means of the adapter 30 whose slot 30' may assume any one of four radial positions. The extent to which screw 31 is tightened also regulates the force of the compression spring 29, although as a general rule this screw will be completed seated.

It will be seen that in a divergent movement of elements 10 and 11, the resistance of the friction elements and of spring 29 must be overcome, while at the return movement spring 29 overcomes the resistance of the friction elements.

The system of lubrication is as follows: The boss 20' has a boring 36 into which is screwed a grease connection 37, Figs. 2 and 9. A boring 38, having its orifice on the inner face of the back plate 20, communicates with the boring 36. The arrangement of studs 24 and holes 23' allows of two alternative positions of friction member 23 relative to the back plate and for this reason member 23 is provided with two diametrically opposite bores 39, either one of which may register with bore 38, Figs. 2 and 3. The bore 39, then, communicates with a chamber existing between the adjacent vertical faces of annuli 19 and 23, and, more specifically with an annular groove 40 on the inner face of the latter. The outer edge of member 23 is provided with a series of notches 41, which, however, do not extend quite to the extreme circumference (see particularly top of member 23, Fig. 2). The member 23 also has a series of transverse radial bores 42 communicating with an inner peripheral groove 43 and an outer peripheral groove 44. Axially extending bores 45 connect groove 40 and bores 42.

Face 19' of annulus 19 has apertures 46, Figs. 2 and 6, on a line with groove 43 of member 23 and thrust member 25 has an annular groove 47 communicating with apertures 46, Fig. 2. Transverse axially extending bores 48, Figs. 2 and 4, in thrust member 25 connect groove 47 with an annular groove 49 on the other working face of the thrust member.

By applying a grease gun to grease connection 37, grease is forced into the recess existing between the vertical adjacent faces of members 19 and 23, filling same. Notches 41 are filled and likewise bores 45 and 42 and grooves 43 and 44.

From groove 43 the grease passes through holes 46, eventually filling groove 47, bores 48, and groove 49. The grease pressure now backing up, the normal pressure between members 19 and 23 is relieved, that is, the force of spring 29 is counteracted by the pressure of the lubricant. This latter pressure continuing, the friction elements are forced apart as shown in Fig. 8 and their contacting faces thoroughly reserviced with the grease. Due to the separation of these elements, drum 13 will be forced away from the back plate 20, this action being permitted, as will be readily understood, by the described structural relation of these parts. Extrusion of the grease from the casing is prevented by the felt washer 50, Fig. 2.

It will thus be seen that all contacting faces are completely lubricated, particularly the main friction faces, by means of the system of ducts which I have provided. The notches 41 retain a considerable amount of grease, and there being eight of them, as illustrated, the contacting face of member 19 is completely re-lubricated at each eighth turn of the stabilizer casing.

Although I have described a specific adaptation of my invention, it is understood that I intend to be limited only in so far as is prescribed in the following claims:

I claim:

1. In a stabilizer, relatively movable casing elements, cooperating friction faces fixed on said casing elements, means yieldably urging said faces towards each other, and means for leading a lubricant under pressure to said faces, said yieldable means permitting a separation of said faces and a corresponding displacement of said casing elements relative to each other under the pressure of the lubricant.

2. In a stabilizer, a pair of annular telescopic casing elements movable with respect to each other, cooperating friction faces fixed on said casing elements and closed thereby, means yieldingly urging said faces towards each other, and means for leading a lubricant under pressure into the enclosure of said casing elements and to said faces, said yieldable means permitting a separation of said faces and a corresponding separation of said casing elements relative to each other under the pressure of the lubricant.

3. In a stabilizer, a pair of annular telescopic casing elements removably secured together, cooperating friction faces fixed on said casing elements and enclosed thereby, and means for leading a lubricant under pressure into the enclosure of said casing elements, whereby the cooperating friction faces enclosed therewith will be lubricated.

ROBERT H. HASSLER.